(12) United States Patent
Schilm et al.

(10) Patent No.: US 9,714,190 B2
(45) Date of Patent: Jul. 25, 2017

(54) COMPOSITION FOR PRODUCING GLASS SOLDERS FOR HIGH-TEMPERATURE APPLICATIONS AND USE THEREOF

(71) Applicant: Fraunhofer-Gesellschaft Zur Foerderung Der Angewandten Forschung, Munich (DE)

(72) Inventors: Jochen Schilm, Dresden (DE); Mihails Kusnezoff, Dresden (DE); Axel Rost, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/378,819

(22) PCT Filed: Feb. 11, 2013

(86) PCT No.: PCT/EP2013/052679
§ 371 (c)(1),
(2) Date: Aug. 14, 2014

(87) PCT Pub. No.: WO2013/120803
PCT Pub. Date: Aug. 22, 2013

(65) Prior Publication Data
US 2015/0038312 A1 Feb. 5, 2015

(30) Foreign Application Priority Data
Feb. 17, 2012 (DE) .......... 10 2012 003 338

(51) Int. Cl.
| | |
|---|---|
| C03C 8/02 | (2006.01) |
| C03C 3/068 | (2006.01) |
| C03C 8/24 | (2006.01) |
| H01M 8/0282 | (2016.01) |
| H01M 8/0286 | (2016.01) |
| C03C 3/095 | (2006.01) |
| H01M 8/124 | (2016.01) |

(52) U.S. Cl.
CPC ............ C03C 8/02 (2013.01); C03C 3/068 (2013.01); C03C 3/095 (2013.01); C03C 8/24 (2013.01); H01M 8/0282 (2013.01); H01M 8/0286 (2013.01); C03C 2205/00 (2013.01); H01M 2008/1293 (2013.01); Y02P 70/56 (2015.11)

(58) Field of Classification Search
CPC ............. C03C 8/02; C03C 8/24; C03C 3/095
See application file for complete search history.

(56) References Cited

U.S. PATENT DOCUMENTS

| | | | |
|---|---|---|---|
| 5,176,772 A | 1/1993 | Ohtaki | |
| 2006/0019813 A1* | 1/2006 | Yoshii | ............... C03C 8/02 501/15 |
| 2010/0119917 A1 | 5/2010 | Kumar et al. | |
| 2012/0183785 A1 | 7/2012 | Schirrmeister et al. | |

FOREIGN PATENT DOCUMENTS

| | | | |
|---|---|---|---|
| DE | 102009038812 A1 | | 3/2001 |
| DE | 102009038812 A1 | | 3/2011 |
| JP | 10139477 | | 5/1998 |
| JP | 2006-056769 | | 3/2006 |
| JP | 2012-162455 | | 8/2012 |
| KR | 2010-0693938 | | 3/2007 |
| KR | 693938 | * | 3/2007 |
| WO | WO2013/120803 A1 | | 8/2013 |

OTHER PUBLICATIONS

Machine translation of KR 693938, Mar. 2007.*
J. Fergus, Sealants for Solid Oxide Fuel Cells; J. Power Sources, vol. 147, pp. 46-57, 2005.
J. Piao et a., Sealing Glass of Barium-Calcium-Aluminosilicate System for Solid Oxide Fuel Cells, J. Rare Earths, vol. 25, pp. 434-438, 2007.
K.D. Meinhardt et al., Synthesis and Properties of a Barium Aluminosilicate solid Oxide Fuel Cell Glass-Ceramic Sealant, J. Power Sources, vol. 182, pp. 188-196, 2008.
M.K. Mahapatra et al., Glass-based Seals for Solid Oxide Fuel and Electrolycer Cells—A Review, Materials Sciences & Engineering, R 67, pp. 65-86, 2010.

* cited by examiner

*Primary Examiner* — Karl Group
(74) *Attorney, Agent, or Firm* — Jacobson Holman, PLLC.

(57) ABSTRACT

A composition is for the manufacture of glass solders for high-temperature applications up to temperatures of approximately 1000° C., which composition, having no $ZrO_2$, has $SiO_2$ at a proportion in the range from 48 mol-% to 62 mol %, $Al_2O_3$ at a proportion in the range from 0.5 mol % to 6 mol %, $B_2O_3$ at a proportion in the range 4 mol % to 12 mol %, BaO at a proportion in the range 12 mol % to 30 mol %, and either CaO at a proportion in the range from 2.5 mol % to 15 mol %, or an $R_2O_3$ at a proportion in the range 0.5 mol % to 20 mol % where the $R_2O_3$ is selected from $La_2O_3$, $Y_2O_3$, $Sc_2O_3$, and from a further oxide of a chemical element from the series of lanthanoids, wherein the $SiO_2$:BaO ratio is in the range from 1.9 to 4.

6 Claims, 4 Drawing Sheets

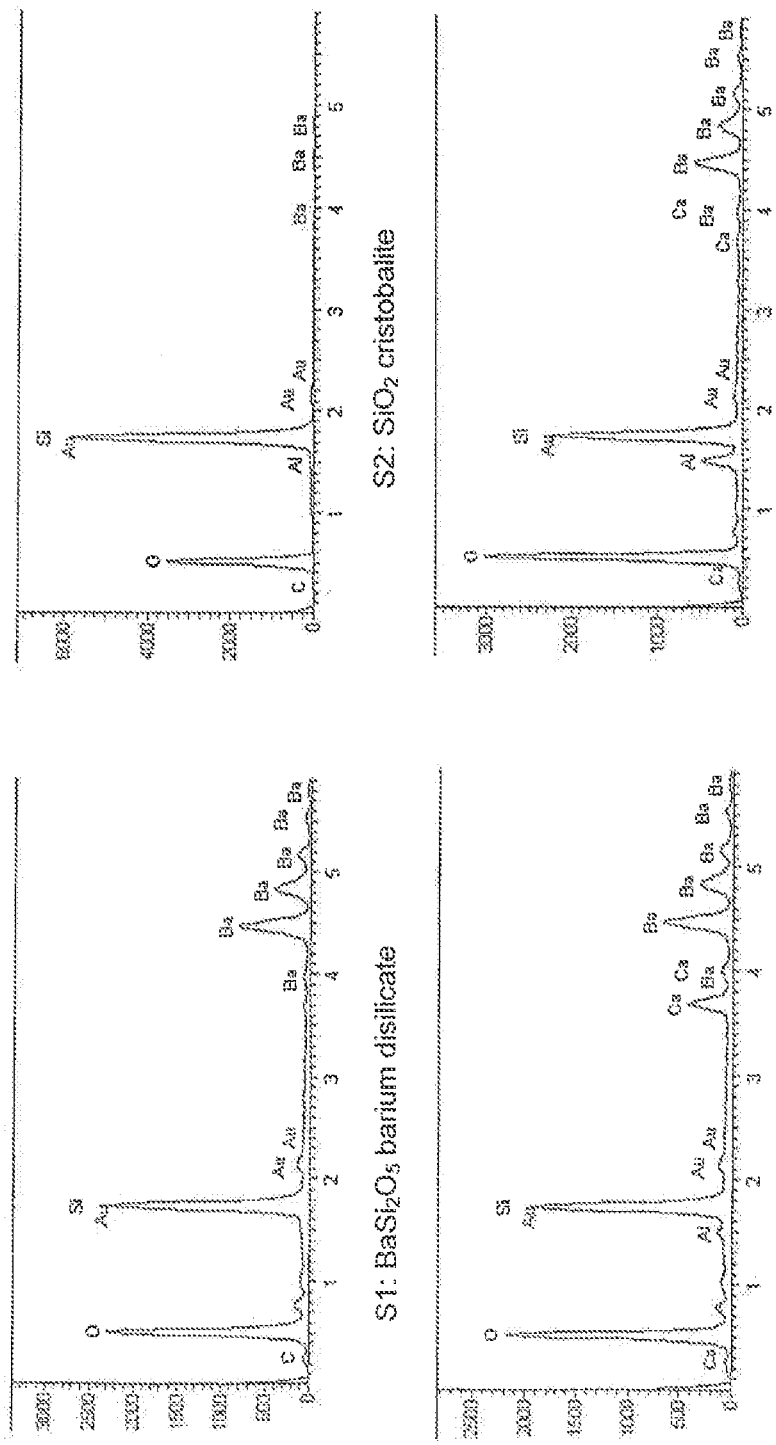

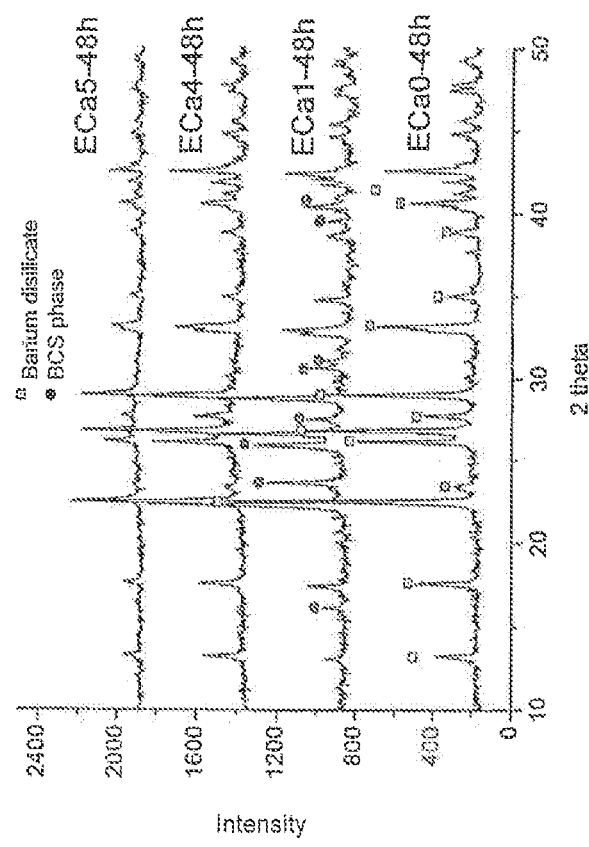
Figure 2: XRD measurements of ECa glasses with 7 mol% CaO and varying Al₂O₃ proportions between 2 and 5 mol% after thermal treatment for 48h at 850°C

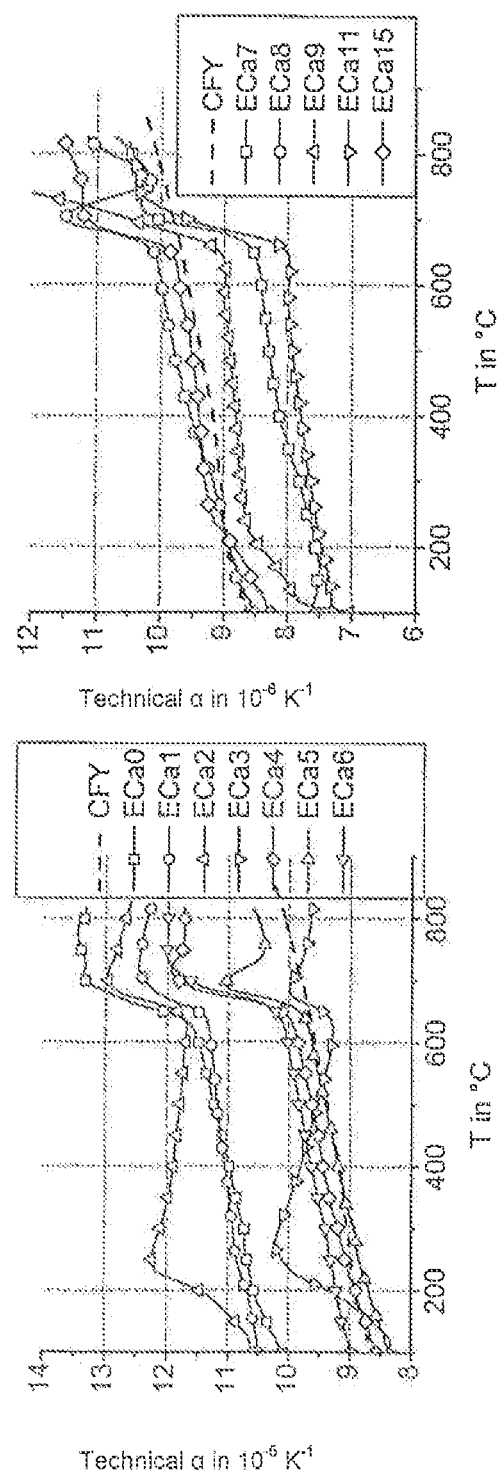
Figure 3: Developments of the temperature-dependent thermal coefficients of expansion for glass solders obtained from ECa samples after subsequent thermal treatment: RT; 2/min → 950°C/2 h; 5 K/min → 850°C/48 h; 5 K/min → RT

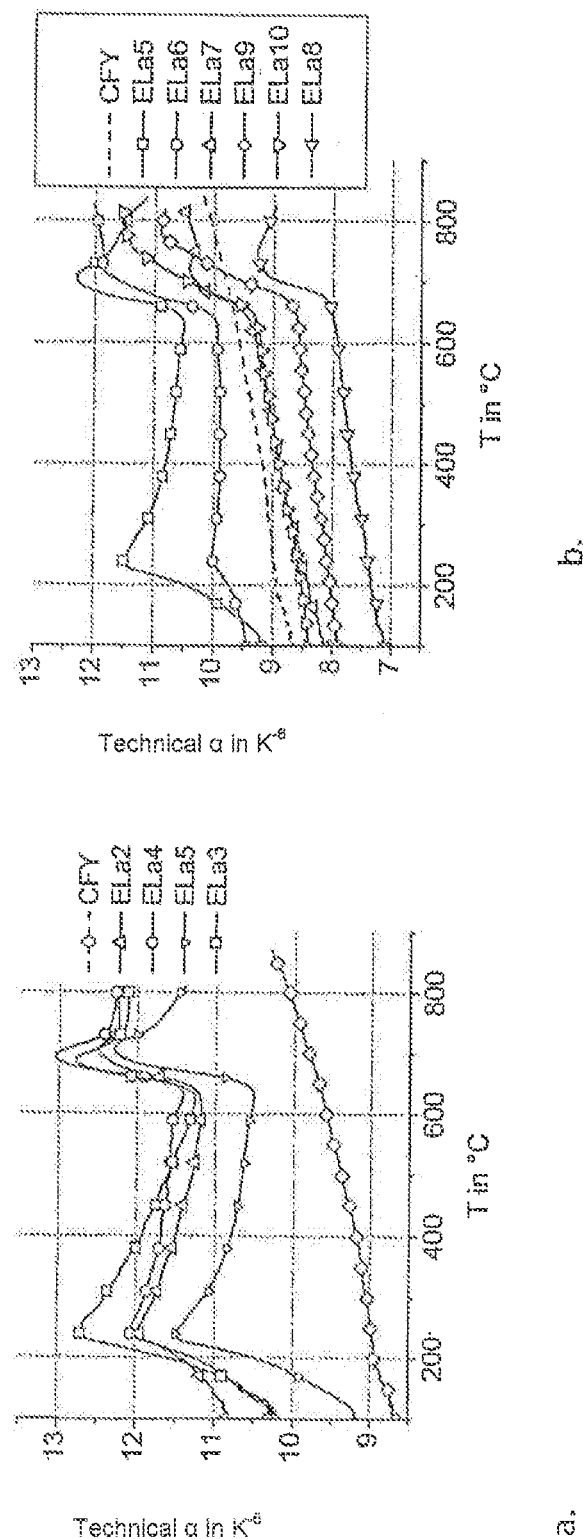
Figure 4: Developments of thermal coefficients of expansion of analyzed ELa glasses after thermal treatment:
RT – 2K/min → 950°C/2h – 5 K/min → 850°C/48 h – 5 K/min → RT

COMPOSITION FOR PRODUCING GLASS SOLDERS FOR HIGH-TEMPERATURE APPLICATIONS AND USE THEREOF

The Invention relates to compositions for producing glass solders for high-temperature applications up to temperatures of around 1000° C. and to their use. They can preferably be used for the joining and sealing of SOFC fuel cells.

On the joining and for the sealing of SOFC stacks, high demands generally have to be satisfied due to heterogeneous material combinations of metal and ceramic material, high operating temperatures (from 650° C. to 950° C.), aggressive dual atmospheres comprising air and fuel gas as well as electrical voltages.

Different technical solutions are currently the subject of research and development. They include glass solders, metallic hard solders, mica, mica composites with metal and glass as well as technically complex and/or expensive special solutions. To date, none of them have been able to prove technically relevant and to establish themselves on the market. However, solders based on glass in partial or also in almost completely crystalline form are considered the most promising solution. The use of crystallizing glass solders currently represents the substantial state of the art in this area of application. The operating temperatures can vary from 600 to 900° C. depending on the metallic components used for the interconnectors (ferritic steels, chromium-based alloys) which are used in SOFCs and on the design of the MEAs. This requires maximum joining temperatures using glass solders of up to 1000° C. A plurality of demands which the glass solders to be used have to satisfy thus result.

When the joining temperature is reached, the glass phase must have a sufficiently low viscosity (<$10^{-6}$ Pas) to ensure a good bonding to the metallic and ceramic joining partners.

During the joining process, the gas phase portion must be sufficiently large (>40% by volume) to allow a sufficient flow of the glass.

To set the required thermal coefficient of expansion (TCE) of >$9.0 \cdot 10^{-6}$ K$^{-1}$, crystal phases crystallize out of the glass during or after joining which have a correspondingly high TCE. These crystal phases should not change significantly in either type, modification or proportion within the service life of SOFC stacks to avoid any change in the properties of the glass solder.

Note: The thermal coefficient of expansion (TCE) is given as the technical thermal coefficient of expansion in this document. In the giving of the technical coefficient of expansion $\alpha[1/K]$, the length change ($\Delta l$) is related to the normal conditions:

$$\alpha = (l - l_0)/l_0(T - T_0)$$

In addition, the glass solder should have a good chemical compatibility with the joining partners and a high stability in dual atmospheres.

The actual joining process typically starts with an amorphous glass solder which has such a low viscosity on reaching the joining temperature that a bonding of the glass melt to the joining partners can take place. The crystallization of solid phases in the glass melt already begins at the start of the joining process. The object of the crystalline phase is, on the one hand, to raise the thermal coefficient of expansion (TCE) of the completely amorphous glass, which is too low, from around $4 \cdot 10^{-6}$ K$^{-1}$ to $7 \cdot 10^{-6}$ K$^{-1}$ to a value which is only around $0.1 \cdot 10^{-6}$ K$^{-1}$ to $2 \cdot 10^{-6}$ K$^{-1}$ below the TCEs of the materials to be joined in the SOFC stacks. Suitable values for the TCE of crystalline glass solders for the SOFCs are in the range from $9 \cdot 10^{-6}$ K$^{-1}$ to $11.5 \cdot 10^{-6}$ K$^{-1}$ with respect to a temperature range between room temperature and the glass transition temperature $T_g$ of the glass solder, where $T_g$ can be from 600° C. to 700° C. In this manner, thermomechanical strains in SOFC stacks can be avoided as soon as they are cooled to temperatures beneath the softening temperature ($T_g$) of the glass solder. Consequences of excessive thermomechanical strains in SOFC stacks include, for example, cracking as well as deformations of the components which would have a negative influence on the functionality of the SOFC stacks. On the other hand, the viscosity of the solder system can be increased by the crystalline solid portion, which gives the SOFC stacks an improved mechanical stability under operating conditions.

Critical components such as alkali oxides ($R_2O$), oxides of polyvalent ions (e.g. $V_2O_5$, CuO, $Co_3O_4$) or heavy metal oxides (e.g. PbO, $Bi_2O_3$, CdO) can typically be contained in known glass solder compositions. These components should, however, where possible, not be contained or only be contained in very small proportions since their property profiles can have a negative effect on the relevant properties of glass solders for SOFCs such as long-term stability, reactivity with respect to metallic joining partners as well as electrical insulating capability.

BaO and CaO to date represent the most frequently occurring components in glass ceramic solders for SOFC applications. The glass solders known in connection with these oxides, however, have portions of BaO and CaO in ratios to other relevant oxides ($SiO_2$ and $Al_2O_3$) which result—in crystallization processes—in barium monosilicate ($BaSiO_3$), barium silicates having variable stoichiometries ($Ba_5Si_3O_{12}$, $Ba_3Si_2O_5$, $BaSi_2O_5$, cf. in this respect BaO—$SiO_2$ phase diagram), celsican phases ($BaAl_2SizO_5$) as well as further crystal phases containing Ca($CaSiO_3$, anorthite). Some of these crystal phases, for example, thus have thermal coefficients of expansion which can be classified as too small for a use in glass solders and are desirably to be avoided.

The application area for the known glass solders is substantially restricted to SOFC types whose application temperatures lie at a maximum of 800° D. (ASC type or special ceramic electrolytes).

The following glass composition is known from U.S. Pat. No. 6,124,224 B1:
18 wt %-60 wt. % $SiO_2$; 2 wt %-32 wt % $A_2O_3$; 0 wt %-2 wt. % $Na_2O$; 0 wt %-3 wt % $K_2O$;
0 wt %-3 wt % $R_2O$; 0 wt %-25 wt % MgO; 17 wt %-56 wt % SrO; 17 wt %-56 wt % BaO;
0 wt %-20 wt % $Y_2O_3$; 0 wt %-7 wt % $ZrO_2$; 0 wt %-5 wt % $Co_3O_4$; 0 wt %-5 wt % NiO; and
0 wt %-3 wt % $MoO_3$.

The glass solder thus contained is, however, not present in crystalline form in use after the joining. In no form are crystal phases formed in a thermal treatment which should be present for adapting specific properties in the structure of the glass. The thermal coefficient of expansion of the glass solder lies in the range between $45 \cdot 10^{-7}$ K$^{-1}$ and $90 \cdot 10^{-7}$ K$^{-1}$ in accordance with the Indications of the named patent specification.

It is therefore the object of the invention to provide a glass composition which has a crystalline phase, a residual glass proportion having a glass transition temperature which lies below the maximum operating temperature at high temperatures. Furthermore, the glass solder in accordance with the invention should have an adapted thermal coefficient of expansion and a high chemical stability, in particular on use of chromium materials or of materials on a chromium base in dual atmospheres. Long-term temperatures of use of SOFC stacks of at least 850° C. should furthermore be possible with this glass solder.

This object is achieved in accordance with the invention by a glass solder composition having the features, uses, advantageous embodiments and further developments described below.

The composition in accordance with the invention for the manufacture of glass solders for high temperature applications contains $SiO_2$ having a proportion in the range of 48 mol % to 62 mol %, $Al_2O_3$ having a proportion in the range of 0.5 mol % to 6 mol %, $B_2O_3$ having a proportion in the range of 4 mol % to 12 mol %, and BaO having a proportion in the range of 12 mol % to 30 mol %, as well as CaO having a proportion of 2.5 mol % to 15 mol % and/or an $R_2O_3$ having a proportion in the range of 0.5 mol % to 15 mol %.

No $ZrO_2$ should be contained in the composition in accordance with the invention since this disadvantageously influences the crystallization behavior.

The $R_2O_3$ is in this respect selected from $La_2O_3$, $Y_2O_3$, $Sc_2O_3$ and a further oxide of a chemical element from the series of lanthanoids (e.g. $Nd_2O_3$, $Pr_2O_3$, $Sm_2O_3$). It can be favorable to select the minimum proportion of $R_2O_3$ as 2 mol %, preferably 4.5 mol %.

The use of $La_2O_3$ can be said to be particularly advantageous as a component for $R_2O_3$.

A ratio of $SiO_2$:BaO in the range of 1.9 to 4 has to be observed.

Advantageous embodiments are characterized in that: the portion of contained BaO lies in the range from 16 mol % to 30 mol % with $La_2O_3$ contained in the composition; with CaO contained in the composition, an $SiO_2$:BaO ratio in the range of 1.9 to 3.5 is observed; with $La_2O_3$ contained in the composition, an $SiO_2$:BaO ratio in the range from 2.2 to 4.5 is observed; with CaO and $La_2O_3$ contained together in the composition, an $SiO_2$ BaO ratio in the range from 2.3 to 4.3 is observed; at least one further oxide is contained which is selected from $Ta_2O_5$, $Nb_2O_5$, $SnO_2$, $GeO_2$, $As_2O_3$, $Sb_2O_3$, and an oxide of a chemical element from the series of the lanthanoids, where the proportion of one or more of these oxides is kept below 10 mol %.

BRIEF DESCRIPTION OF THE DRAWING

FIG. 1 graphically displays EDX analyses of partly crystalline structures.

FIG. 2 graphically displays XRD measurements of ECa glasses.

FIG. 3 graphically displays temperature-dependent thermal coefficients of expansion for glass solders obtained from ECa glasses.

FIG. 4 graphically displays thermal coefficients of expansion of analyzed ELa glasses after thermal treatment.

The glasses smelted from these nominal compositions are preferably used in particulate form.

With $La_2O_3$ contained in the composition, the proportion of contained BaO should lie in the range from 12 to 30 mol %. It is likewise permissible that CaO and $La_2O_3$ or a component to be substituted accordingly are contained together in suitable glass solder compositions. In this respect, the respective possible proportions of these oxides are to be considered separately from one another.

If CaO and no $R_2O_3$ is contained in the composition, a ratio of $SiO_2$:BaO should be observed in the range from 1.9 to 3.6, preferably in the range from 2.4 to 3.4, and particularly preferably in the range from 2.6 to 3.2.

With $R_2O_3$ contained instead of CaO, a preferred range of the ratio of the proportions of $Si_2$:BaO is between 2.2 and 4.5 and a particularly preferred ratio in the range from 2.5 to 3.8.

If CaO and $La_2 2O_3$ are together contained in the glass solder compositions, a ratio of $SiO_2$:BaO should be observed in the range from 2.3 to 4.3, preferably in the range from 2.6 to 4.0, and particularly preferably in the range from 3.0 to 3.8.

In addition, at least one further oxide can additionally be contained which is selected, for example, from: rare earth oxides, $Ta_2O_5$, $Nb_2O_5$, $SnO_2$, $GeO_2$, $As_2O_3$ and $Sb_2O_3$. The proportion of one or more of these oxides should be kept below 10 mol %. It is assumed that a skilled person can select suitable oxides, also other than those previously named, and can thus admix small amounts to the claimed glass compositions without the substantial properties of the glass solders being lastingly changed. The claimed glass compositions and thus the related relevant properties can remain unaffected by such small modifications.

A proportion of $SiO_2$ is preferably to be observed in the glass solder composition in accordance with the invention in the range from 56 mol % to 60 mol %. A particularly preferred range lies between 58 mol % and 60 mol %.

A proportion of BaO is preferably to be observed in the range from 20 mol % to 27 mol % when CaO is contained and no $R_2O_3$ (with the exception of $B_2O_3$). A particularly preferred range then lies between 21 mol % and 24 mol %.

If $R_2O_3$, particularly $La_2O_3$, and no CaO is contained, a preferred range of contained BaO is from 14 mol % to 24 mol %. This range particularly preferably lies between 12 mol % and 22 mol %.

The proportion of contained $B_2O_3$ should preferably lie in the range from 4 mol % to 9 mol %, and particularly preferably between 4 mol % and 7 mol % when CaO is contained. With $R_2O_3$ contained instead of CaO, the preferred range should lie between 5 mol % and 10 mol % and particularly preferably between 4 mol % and 7 mol %.

The proportion of contained $Al_2O_3$ should preferably lie in the range from 1 mol % to 4 mol %. A range between 2 mol % and 3.5 mol % is particularly preferred when CaO is contained. With contained $R_2O_3$, this particularly preferred range lies between 1.5 mol % and 3 mol %.

The proportion of contained $B_2O_3$ should preferably lie in the range from 4 mol % to 9 mol %. A range between 4 mol % and 7 mol % is particularly preferred when CaO is contained. With contained $R_2O_3$, the preferred range lies between 5 mol % and 10 mol % and the particularly preferred range between 6 mol % and 9 mol %.

A composition in accordance with the invention can be used such that a glass solder is contained in the glass solder after a thermal treatment having a partially crystalline structure whose proportion is less than 50 wt % of crystalline phase. This structure can substantially be composed of a barium silicate, barium calcium silicate, lanthanum silicate, lanthanum calcium silicate or a lanthanum borosilicate.

After a thermal treatment, a partially crystalline glass solder obtained in this manner can have the following features: A dilatometric softening point is present at a temperature of 650° C. to 800° C. and a glass transition temperature $T_G$ in the range from 600° C. to 700° C. Furthermore a glass solder in accordance with the invention has a thermal coefficient of expansion which lies in a temperature range between 20° C. and the glass transition temperature $T_G$ in the range from $8 \cdot 10^{-6} K^{-1}$ to $12 \cdot 10^{-6} K^{-1}$.

The thermal treatment to be carried out for this purpose is described in the general description and in the embodiments in the following.

Glass solders obtained in this manner can be processed and used for joining or sealing at temperatures in the range from 800° C. to 1000° C., preferably between 850° C. and 950° C.

A composition in accordance with the invention can contain CaO or $La_2O_3$ as important components, with the molar compositions in which $La_2O_3$ is contained differing only slightly from those containing CaO.

With glass solders manufactured using compositions in accordance with the invention, $BaSi_2O_5$ or also $Ba_xCa_ySi_2O_5$ as well as lanthanum silicates or lanthanum borosilicates are contained as only crystal phases. Within the framework of the present invention, either $BaSi_2O_5$ or $BaSi_2O_5$ in combination with $Ba_xCa_ySi_2O_5$ represents the crystal phase(s) determining the properties. Further crystal phases do not occur or are to be avoided in the case of cristobalite.

In some glass solder compositions, the formation of cristobalite ($SiO_2$) can occur. This crystal phase is admittedly generally to be avoided, but can be tolerated in proportions of less than 5 wt % (XRD analysis via Rietveld).

Using the compositions in accordance with the invention, a limited number of thermodynamically stable crystal phases can be formed in the joined glass solder structure (barium disilicate, barium calcium disilicate and minimal proportions of cristobalite, quartz, hexacelsian, barium monosilicate, calcium monosilicate). Due to the direct setting of only a few crystal phases having a proportion of below 50 wt %, a partially crystalline glass solder structure results in the joined state in which the properties of the residual glass phase can be continuously modified within certain limits.

The glasses can thus be set in a simple manner within specific limits with a small effort with respect to relevant properties such as their softening behavior and thermal coefficients of expansion.

Examples for compositions with $BaO$—$CaO$—$B_2O_3$—$Al_2O_3$—$SiO_2$ were compiled in the following tables. The individual compositions of samples were marked by ECa and a respective following number.

TABLE 1

Composition of the manufactured and examined ECa glass solders

| | mol % | | | | | | |
|---|---|---|---|---|---|---|---|
| Component | ECa0 Not as per invention | ECa1 | ECa2 | ECa3 | ECa4 | ECa5 | ECa6 |
| $SiO_2$ | 58 | 58 | 58 | 58 | 58 | 58 | 60 |
| $Al_2O_3$ | 2 | 2 | 2 | 2 | 3 | 4 | 3 |
| BaO | 31 | 24 | 22 | 20 | 24 | 24 | 24 |
| CaO | | 7 | 9 | 11 | 7 | 7 | 7 |
| $B_2O_3$ | 9 | 9 | 9 | 9 | 8 | 7 | 6 |

| | mol % | | | | |
|---|---|---|---|---|---|
| Component | ECa7 | ECa8 | ECa9 | ECa11 | ECa15 |
| $SiO_2$ | 60 | 60 | 60 | 58 | 60 |
| $Al_2O_3$ | 5 | 3 | 3 | 3 | 3 |
| BaO | 22 | 22 | 20 | 18 | 21 |
| CaO | 7 | 9 | 11 | 14 | 10 |
| $B_2O_3$ | 6 | 6 | 6 | 7 | 6 |

The crystal phase composition has been determined after a thermal treatment by means of FESEM/EDX and XRD for the samples named in Table 2 for some compositions. The temperature was first increased with a heating rate of 2 K/min to 950° C. in the thermal treatment. This maximum temperature was held for a period of 2 h and was subsequently cooled at a rate of 5 K/min to 850° C. This temperature was held for 48 h and was subsequently cooled at a rate of 5 K/min to room temperature.

TABLE 2

Crystal phase composition after thermal treatment
(FESEM/EDX and XRD): RT - 2 K/min → 950°
C./2 h - 5 K/min → 850° C./48 h - 5 K/min → RT

| Glass name | ECa0 | ECa1 | ECa2 | ECa3 | ECa4 | ECa5 | ECa6 | ECa7 |
|---|---|---|---|---|---|---|---|---|
| BS2 | Yes | Yes | Yes | Yes | Yes | Yes | Yes | Yes |
| $B_xC_yS2$ | — | Yes | Yes | Yes | — | — | — | — |
| $SiO_2$ | — | — | Yes | Yes | — | — | — | — |
| Celsian | — | — | — | — | — | Yes | — | Yes |

| Glass name | ECa8 | ECa9 | ECa11 | ECa15 |
|---|---|---|---|---|
| BS2 | Yes | Yes | Yes | Yes |
| $B_xC_yS2$ | — | — | — | — |
| $SiO_2$ | — | Yes | — | Yes |
| Celsian | — | — | — | — |

Radiographic analyses in combination with FESEM/EDX analyses and measurements of the thermal coefficient of expansion on the glasses of the samples ECa0, ECa1, ECa2 and ECa3 produced the following findings. Proportions of CaO in the region from 7 mol % to 11 mol % at a proportion of 2 mol % $Al_2O_3$ resulted in the formation of a $Ba_xCa_ySi_2O_5$ phase (where x+y=2 (see FIG. 1)). This phase can be identified in X-ray diffractograms using the reflections marked in FIG. 3. In addition, the crystallization of this phase is considerably delayed in time in comparison with the $BaSi_2O_3$ phase, as the comparison of the diagrams shown in FIG. 1 shows.

It was able to be found in the evaluation that certain BaO:CaO ratios result in proportions of crystalline $Ba_2SiO_3$ phase in the structure of the crystallized glass ceramics and in the forming of cristobalite ($SiO_2$) (see FIG. 1). BaO:CaO ratios of less than 2.4 equally result in these compositions in the formation of $CaSiO_3$ phases (EDX analysis of a structure of ECa3).

EDX analyses of the partially crystalline structure can be seen from the diagrams shown in FIG. 1.

The thermal coefficients of expansion for the compositions ECa2 and ECa3 and the typical developments caused in this respect by a phase transformation of the proportion of cristabolite present in the glass solder having a maximum in the temperature range between 200° C. and 300° C. can be seen from the graphical representation shown in FIG. 3.

In accordance with the invention, glass solder compositions are avoided which can result in the formation of cristobalite since crystal phases having such properties can result in cracking or leaks in the glass solder structure. The proportions of $BaSi_3O_5$ phase for the composition ECa3, which decrease in amount, thus cause a substantial drop in the TCE in comparison with the compositions ECa0, ECa1 and ECa2. Despite the cristobalite proportion in ECa2, the data show that BaO:CaO ratios up to a minimal value of 2.4 only result in slightly varying TCE values, which can be seen from the following Table 3.

TABLE 3

TCE values of the ECa glasses ECa0, ECa1, ECa2 and ECa3 with varying BaO:CaO ratios for the temperature range between room temperature and the respective glass transition temperature Tg of the crystallized glass.

| Material | ECa0 | ECa1 | ECa2 | ECa3 |
|---|---|---|---|---|
| BaO:CaO ratio | No CaO | 3.44 | 2.44 | 1.82 |
| TCE/$10^{-6}$ K$^{-1}$ from 100° C.-T$_g$ | 11.6 | 11.3 | 11.7 | 9.3 |
| T$_g$/° C. (±5° C.) | 629 | 640 | 640 | 630 |

In the compositions ECa6, ECa8, ECa9 and ECa15, the BaO:CaO ratio was varied between 3.44 and 1.82, with the $SiO_2$, $Al_2O_3$ and $B_2O_3$ proportions remaining unchanged. The results of the TCE measurements are shown in the following Table 4 from which it can be seen that the respective TCE for molar BaO:CaO ratios only changes slightly between 2.1 and 3.44 with given proportions for $SiO_2$, $Al_2O_3$ and $B_2O_3$ and showing a favorable value for the joining of materials which contain chromium and are in particular used for interconnectors.

TABLE 4

TCE values of the ECa glasses ECa6, ECa8, ECa15 and ECa9 with varying BaO:CaO ratios for the temperature range between room temperature and the respective glass transition temperature Tg of the crystallized glass

| Material | ECa6 | ECa8 | ECa15 | ECa9 |
|---|---|---|---|---|
| BaO:CaO ratio | 3.44 | 2.44 | 2.1 | 1.82 |
| TCE/$10^{-6}$ K$^{-1}$ from 100° C.-T$_g$ | 10.1 | 10.1 | 9.8 | 9.0 |
| T$_g$/° C. (±5° C.) | 651 | 655 | 651 | 640 |

The influence of the respective $Al_2O_3$ proportion was analyzed using the compositions ECa0, ECa1, ECA4 and ECa5. In this respect, molar $Al_2O_3$:$B_2O_3$ ratios between 0.22 and 0.57 were set. Varying proportions of $Al_2O_3$ at 7 mol % CaO for the samples ECa1, ECa1, ECa4 and ECa5 show that the barium calcium silicate phase is only formed at an $Al_2O_3$ proportion of up to 2 mol %. Higher proportions of $Al_2O_3$ suppress the formation of this phase. This means that the CaO component completely remains in the residual glass phase and no further crystal phase crystallizes as $BaSi_2O_5$. The following Table 5 shows the effects of this changed crystallization behavior on the thermal coefficient of expansion.

TABLE 5

TCE values of the ECa glasses ECa0, ECa1, ECa4 and ECa5 with varying $Al_2O_3$ proportions for the temperature range between room temperature and the respective glass transition temperature Tg of the crystallized glass

| Material | ECa0 | ECa1 | ECa4 | ECa5 |
|---|---|---|---|---|
| $Al_2O_3$ proportion/mol % | 2 | 2 | 3 | 4 |
| TCE/$10^{-6}$ K $-1$ from 100° C.-T$_g$ | 11.6 | 11.3 | 10.0 | 9.7 |
| T$_g$/° C. (±5° C.) | 629 | 640 | 645 | 651 |

FIG. 2 shows XRD measurements of ECa batches with 7 mol % CaO and varying $Al_2O_3$ proportions between 2 mol % and 5 mol % after a thermal treatment for 48 h at 850° C.

$SiO_2$ represents the network-forming main component in compositions with molar proportions of more than 50 mol %. However, with proportions of 54 mol % $SiO_2$ and more in combination with unfavorable proportions of the listed remaining components in corresponding proportions, glass solder compositions are obtained which have crystobalite as an unwanted crystal phase on passing through thermal treatments typical for joining processes. The disadvantages of cristobalite in the glass solders were already described. It was found with reference to the presented glass solder compositions that with $Al_2O_3$ proportions of 1.5 mol % to 4 mol % and more, preferably 2 mol % to 3 mol %, the crystallization of cristobalite can be effectively suppressed when the $SiO_2$:BaO ratio amounts to less than <2.9 and the absolute $SilO_2$ proportion lies below 62 mol % or more preferably below 60.5 mol %. Furthermore, the CaO proportions should in this respect supplement the total proportion of earth alkali oxides (BaO+CaO) in the glass solder to at least 28 mol % and more preferably to at least 30 mol %. Table 6 presents a summarizing overview of the glass transition temperatures of the crystallized glass solders and of the thermal coefficients of expansion.

TABLE 6

TCE values and the T$_g$ values of samples, after a thermal treatment
RT-- 2 K/min → 950° C./2 h-- 5 K/min → 850° C./48 h-- 5 K/min → RT

| | Sample | | | | | |
|---|---|---|---|---|---|---|
| Material | CFY | ScSZ | ECa0 | ECa1 | ECa2 | ECa3 |
| TCE/$10^{-6}$ K-1 from 100° C. - T$_g$ | 9.6 | 9.6 | 11.6 | 11.3 | 11.7 | 9.3 |
| T$_g$/° C. (±5° C.) | — | — | 629 | 640 | 640 | 630 |

| | Sample | | | | | | |
|---|---|---|---|---|---|---|---|
| | ECa4 | ECa5 | ECa6 | ECa7 | ECa8 | ECa9 | ECa11 | ECa15 |
| TCE/$10^{-6}$ K$^{-1}$ from 100 - T$_g$ ° C. | 10.0 | 9.7 | 10.1 | 8.5 | 10.1 | 9.0 | 8.0 | 9.8 |
| T$_g$/° C. (±5° C.) | 645 | 651 | 651 | 650 | 655 | 640 | 655 | 651 |

FIG. 3 shows TCE developments of the analyzed ECa compositions after a thermal treatment: RT; 2 K/min→950 C/2 h; 5 K/min→850° C./48 h; 5 K/min→RT.

In a further series of partially crystallizing glass solder compositions for SOFCs, the component CA0 was replaced with $La_2O_3$. Table 7 shows the composition of analyzed ELa glass solder samples. They are similar to the ECa compositions in their basic compositions.

TABLE 7

Composition of the manufactured and analyzed ELa glass solders

| Component mol % | ELa2 | ELa3 | Ela 4 | ELa5 | Ela 6 | ELa7 | ELa8 | ELa9 | Ela10 |
|---|---|---|---|---|---|---|---|---|---|
| $SiO_2$ | 60.5 | 60 | 60 | 60 | 58 | 58 | 60 | 60 | 58 |
| $Al_2O_3$ | 1.5 | 1 | 1.5 | 2 | 2 | 2 | 4 | 3 | 2 |
| BaO | 24 | 23 | 23 | 24 | 20 | 20 | 20 | 18 | 18 |
| $La_2O_3$ | 3 | 4 | 3.5 | 3 | 9 | 11 | 9 | 11 | 13 |
| $B_2O_3$ | 11 | 12 | 12 | 11 | 11 | 9 | 7 | 7 | 9 |

TABLE 8

Summary of the TCE values and of the $T_g$ values of samples after thermal treatment
RT; 2 K/min → 950° C.;/2 h; 5 K/min → 850° C./48 h; 5 K/min → RT

| Composition | Ela 2 | Ela 3 | ELa 4 | ELa 5 | ELa 6 | ELa 7 | ELa 8 | ELa 9 | ELa10 |
|---|---|---|---|---|---|---|---|---|---|
| $TCE/10^{-6} K^{-1}$ from 100° C.-$T_g$ | 10.9-11.2 | 10.2-11.3 | 10.2-11.6 | 9.2-10.6 | 9.4-10.0 | 8.1-9.5 | 7.1-8.1 | 7.9-8.7 | 8.4-9.4 |
| $T_g$/° C. (±5° C.) | 638 | 632 | 642 | 644 | 651 | 654 | 674 | 670 | 655 |

The compositions ELa2, ELa4, ELa3 and ELa5 show a pronounced crystallization of cristobalite (peaking in the range from 230° C. to 260° C.) in their temperature-dependent curves of the TCE (FIG. 4). This behavior is also observed in the compositions ECa2 and ECa3 containing CaO (cf. FIG. 4). No effective suppression of the cristobalite formation is possible in this composition rage with the participation of $La_2O_3$ in proportions up to 4 mol %. It can be assumed that a further increase of the $Al_2O_3$ proportion can show a clearer effect in this respect. However, it can moreover be assumed that the formation of the desired sanbornite phase is also reduced with the suppression of the critobalite phase. The composition ELa5 already shows a tendency in this direction with an $Al_2O_3$ proportion of 2 mol % whose TCE value is below the TCE value of the compositions ELa2 to ELa4.

The cristabolite formation occurs in a very weakened form, and thus in a degree still tolerable for the application in SOFCs, in the composition ELa6 in which the $La_2O_3$ proportion was raised to 9 mol % (FIG. 4). Comparable glasses containing CaO can be obtained using the compositions ECa9 and ECa15. A comparison of the glass compositions of the corresponding ECa and ELA samples allows conclusions of analog causes for this behavior with $SiO_2$ proportions between 58 mol % and 60 mol % in conjunction with $Al_2O_3$ proportions≤2 mol % and BaO proportions≤24 mol % for both glass families (with calcium oxide and lanthanum oxide). A comparison of the compositions of ELa6 and ELa7 shows the effect of an $La_2O_3$ proportion increased by 2 mol %, whereby the cristobalite formation can be suppressed so far that it cannot be demonstrated either as a peak in the measurement of the thermal coefficient of expansion or by means of XRD. In addition to $BaSi_2O_5$, barium calcium silicates and lanthanum silicates can in this respect moreover be detected. In the event that the glass solders contain calcium oxide and lanthanum oxide together, lanthanum calcium silicates (e.g. $Ca_3La_6(SiO_4)_6$) can also be detected.

A comparison of the glass solders obtained with the compositions ELa6 and ELa8 shows that the increase in the $Al_2O_3$ proportion from 2 mol % to 4 mol % results in a reduced thermal coefficient of expansion of the crystallized structure, which is due to a low degree of crystallinity according to XRD analyses (cf. ECa samples in this respect). It can be shown with reference to the compositions ELa9 and ELa10 that reduced $Al_2O_3$ proportions and higher $La_2O_3$:BaO ratios again result in an increase in the TCE. The compositions ELa7 and ELa10 have a good adaptation of the expansion behavior without cristobalite phases to a metallic interconnector material in which chromium is contained, e.g. CFA (Plansee company, Reutte, Austria). Table 8 summarizes the measured coefficients of expansion and the glass transition temperatures ($T_g$) of the analyzed ELa compositions.

In a further series, samples were manufactured with compositions which contain CaO and La2O3 together.

TABLE 9

Compositions of the manufactured and analyzed glass solders which contain CaO and La2O3

| Component/mol % | ECa18 | ECa19 |
|---|---|---|
| $SiO_2$ | 58 | 59 |
| $Al_2O_3$ | 3 | 3 |
| BaO | 16 | 17 |
| CaO | 12 | 9 |
| $La_2O_3$ | 5 | 6 |
| $B_2O_3$ | 6 | 6 |

Table # represents an overview of the glass transition temperatures of the crystallized glass solders and of the thermal coefficients of expansion of glass compositions which contain CaO and La2O3 together.

TABLE 10

Summary of the TCE values and of the $T_g$ values of samples after thermal treatment: RT; 2 K/min → 950° C.;/2 h; 5 K/min → 850° C./48 h; 5 K/min → RT

| Composition | ECa18 | ECa19 |
|---|---|---|
| $TCE/10^{-6} K^{-1}$ from 100° C.-$T_g$ | 7.2-9.1 | 7.8-9.9 |
| $T_g$/° C. (±5° C.) | 664 | 665 |

With glass solder compositions with BaO—CaO—$B_2O_3$—$Al_2O_3$—$SiO_2$ and with BaO—CaO—$La_2O_3$—$B_2O_3$—$Al_2O_3$—$SiO_2$, samples were examined for suitability for joining substrates of materials containing chromium as well as for ferritic steels. In this respect, the softening behavior of cylindrical sample bodies pressed from powdery glass solder compositions was examined using the heating microscope at air at 2 K/min and with the substrate materials as a base. The characteristic shape changes of these molded bodies were evaluated at increasing temperature according to known procedures and are summarized in Table 9 for the ECa samples. With the exception of the samples ECa0 and ECa1, the ball points of the other glass solders are in the range of 900° C. A uniform joining temperature of 950° C. was selected for the realization of the model joints. A screen print paste was manufactured from the glass solder compositions for the design of the model joints carried out and a peripheral frame was printed onto substrates (30 mm×30 mm×2 mm$^3$) with a width of 3 mm and a height of 250 μm. The thermal treatment for the joining process took place in accordance with the following profile at air:
RT; 2 K/min→500° C./2 h; 2 K/min→950° C./2 h; 5 K/min→850° C./48 h; 5 K/min→RT.

Subsequently to this joining procedure, the helium leak rate was measured using an Oerlikon leak finder. With the exception of samples of the composition ECa0, leak-tight model joints were able to be manufactured using the other ECa samples (helium leak rates lower than $10^{-5}$ 1 mbar s$^{-1}$).

In addition, analyses were carried out for evaluating the joining properties of the ELa compositions in an analog manner to the previously described compositions containing calcium. Table 12 lists the characteristic properties of the ELa compositions which could be measured using heating microscopy. In addition, the maximum joining temperatures and the achieved helium leak rakes were determined. The results here also show that leak-tight joints can be achieved with the listed glass solders using the substrates in question. Unlike the ECa compositions, which were completely joined with the substrates, the samples of ELa2, ELa3 and ELa4 were jointed with Crofer 22 APU as the substrate material in the case of the ELA compositions (Table 0).

TABLE 11

Sintering and softening behavior of the ECa glasses in accordance with a heating microscope analysis at air at 2 K/min and with CFY as a substrate; helium leak rates of model joints using CFY substrates

| Sample | ECa0 | ECa1 | ECa2 | ECa3 | ECa4 | ECa5 |
|---|---|---|---|---|---|---|
| Sintering start/° C. | 696 | 741 | 730 | 731 | 713 | 716 |
| Sintering end/° C. | 771 | 801 | 803 | 811 | 788 | 789 |
| Softening start/° C. | 803 | 816 | 831 | 831 | 853 | 849 |
| Ball point/° C. | — | — | 891 | 896 | 888 | 894 |
| Half-ball point/° C. | — | — | 1021 | 939 | 928 | 929 |
| 45° angle/° C. | — | 1039 | 1046 | 1026 | 1051 | 1047 |
| Joining temp./° C. | 950 | 950 | 950 | 950 | 950 | 950 |
| He leak rate*/ 1 mbar s$^{-1}$ | >$10^{-2}$ | $2 \cdot 10^{-7}$ | $4 \cdot 10^{-7}$ | <$2 \cdot 10^{-8}$ | <$2 \cdot 10^{-8}$ | <$2 \cdot 10^{-8}$ |

| Sample | ECa6 | ECa7 | ECa8 | ECa9 | ECa11 | ECa15 |
|---|---|---|---|---|---|---|
| Sintering start/° C. | 713 | 728 | 713 | 721 | 711 | 724 |
| Sintering end/° C. | 793 | 808 | 789 | 796 | 793 | 796 |
| Softening start/° C. | 816 | 841 | 828 | 855 | 813 | 836 |
| Ball point/° C. | 910 | 918 | 908 | 946 | 898 | 906 |
| Half-ball point/° C. | — | 966 | 958 | 983 | 948 | 959 |
| 45° angle/° C. | 1081 | 1038 | 1068 | 1044 | 1022 | 1041 |
| Joining temp./° C. | 950 | 950 | 950 | 950 | 950 | 950 |
| He leak rate/ 1 mbar s$^{-1}$ | $5 \cdot 10^{-6}$ | $3.4 \cdot 10^{-8}$ | $2.1 \cdot 10^{-6}$ | $4.4 \cdot 10^{-8}$ | $2.7 \cdot 10^{-8}$ | $5 \cdot 10^{-8}$ |

| Sample | ECa18 | ECa19 |
|---|---|---|
| Sintering start/° C. | 744 | 743 |
| Sintering end/° C. | 822 | 828 |
| Softening start/° C. | 879 | 855 |
| Ball point/° C. | 922 | 935 |
| Half-ball point/° C. | 1024 | 1030 |
| 45° angle/° C. | 1069 | 181 |
| Joining temp./° C. | 950 | 950 |
| He leak rate/ 1 mbar s$^{-1}$ | $2 \cdot 10^{-8}$ | $6 \cdot 10^{-7}$ |

TABLE 12

Sintering and softening behavior of the glass solders obtained with ELa composition in accordance with heating microscope analysis at air at 2 K/min and with YSZ as a substrate; helium leak rates of model joints using CFY substrates (leak rate of the CFY substrate itself: $10^{-6}$ l mbar s$^{-1}$ to $10^{-8}$ l mbar s$^{-1}$)

| Sample | ELa2 | ELa3 | ELa4 |
|---|---|---|---|
| Sintering start/° C. | 702 | 708 | 692 |
| Sintering end/° C. | 781 | 775 | 777 |
| Softening start/° C. | 807 | 810 | 815 |
| Ball point/° C. | — | — | — |
| Half-ball point/° C. | — | 990 | 982 |
| 45° angle/° C. | — | 1054 | 1048 |
| Joining temperature/° C. | 920 | 920 | 950 |
| He leak rate/ l mbar s$^{-1}$ | $2.4 \cdot 10^{-8}$ | $3 \cdot 10^{-11}$ | $4 \cdot 10^{-7}$ |

Joined using Crofer 22 APU

| Sample | ELa5 | ELa6 | ELa7 | ELa8 | ELa9 |
|---|---|---|---|---|---|
| Sintering start/° C. | 714 | 741 | 738 | 743 | 764 |
| Sintering end/° C. | 789 | 814 | 828 | 838 | 834 |
| Softening start/° C. | 814 | 849 | 864 | 863 | 879 |
| Ball point/° C. | — | 909 | 916 | 943 | 948 |
| Half-ball point/° C. | 996 | 1094 | — | — | — |
| 45° angle/° C. | 1048 | >1100 | — | — | — |
| Joining temperature/° C. | 950 | 950 | — | — | — |
| He leak rate/ l mbar s$^{-1}$ | $<2 \cdot 10^{-8}$ | $<2 \cdot 10^{-8}$ | $2.7 \cdot 10^{-7}$ | $7.7 \cdot 10^{-8}$ | $2.7 \cdot 10^{-8}$ |

Joined using CFY

In addition to the characterization of glass solder compositions using model joints, a characterization of the electrical insulation effect took place over longer time periods under SOFC-relevant operating conditions. For this purpose, model samples were taken out at 850° C. which were built up so that the sample interior was able to be flushed using a fuel gas mixture. Electrical voltages in the range from 0.7 V to 30 V applied over the sample height in this respect allow aging conditions close to reality and typical for SOFCs and allow the in situ measurement of the electrical resistance of the glass solder in a sandwich composite between two metal substrates during the aging.

Characteristic developments of the electrical resistances result by the application of electrical voltages of 0.7 V at 850° C. Specific electrical resistances can be calculated while taking account of the geometrical factors of the glass solder joint. On a switching on of electrical voltage, a rapid increase of the electrical resistance initially takes place due to polarization. This is continued up to a maximum value by the formation of boundary layers. The subsequently detected resistance drop or the increasing total conductivity of the sample design can be brought into relation with degradation processes in the glass solder itself and above all with boundary surface reactions between the glass solder and interconnector materials. Two different processes can be considered as the cause. On the one hand, higher ionic or electronic conductivity of the corresponding glass solders. On the other hand, the measured electrical current increases, even when redox reactions run under electron transfer. Such reactions between the glass solder and the interconnector material are above all possible at the polarized boundary surfaces to the metallic substrates. The results of such resistance measurements as an indication of specific resistance values after a test duration of 300 h in Table 13. The measurement of the resistance value of the model joints takes place via a 2-point current measurement at the two steel substrates over the thickness of the glass solder joint directly during the measurement. The measured values are converted over the dimensions of the glass solder joint into a specific electrical resistance value.

TABLE 13

Specific electrical resistances of model joints using different glass solders at 850° C. after aging for 300 h at 850° C. in a dual atmosphere and with an applied electrical voltage of 0.7 V

| Sample | ECa3 | ECa5 | ECa7 | ECa8 | ECa15 |
|---|---|---|---|---|---|
| Specific resistance/ Ohm cm | $18 \cdot 10^6$ | $20 \cdot 10^6$ | $16 \cdot 10^6$ | $25 \cdot 10^6$ | $17 \cdot 10^6$ |

| Sample | Ela6 | ELa8 | Ela5 | Ela7 |
|---|---|---|---|---|
| Specific resistance/ Ohm cm | $4 \cdot 10^6$ | $5 \cdot 10^6$ | $2.2 \cdot 10^6$ | $13 \cdot 10^6$ |

| Sample | ECa18 | ECa19 |
|---|---|---|
| Specific resistance/ Ohm cm | $5.6 \cdot 10^6$ | $3.9 \cdot 10^6$ |

The results show that all tested glass solders have very high specific resistance values after carrying out the test and only negligibly low deteriorations in the dielectric properties are measured in the course of the test procedure.

The invention will be explained in more detail in the following with reference to embodiments.

There are shown:

FIG. 1: EDX analyses of the partly crystalline structure for $BaSi_2O_5$ barium disilicate, $SiO_2$ cristobalite, barium calcium silicate and a calcium-depleted glass matrix;

FIG. 2: XRD measurements of ECa samples with 7 mol % CaO and modified $AL_2O_3$ proportions between 2 mol % and 5 mol % after a thermal treatment over 48 h at 850° C.;

FIG. 3: Developments of the temperature-dependent thermal coefficients of expansion for glass solders obtained from ECa samples with radiographically measured proportions of cristobalite after a following thermal treatment: RT; 2 K/min→950° C./2 h; 5 K/min→850° C./48 h; 5 K/min→RT FIG. 4: Developments of the thermal coefficients of expansion of analyzed ELa glasses after a following thermal treatment:
RT-2 K/min→950° C./2 h-5 K/min→850° C./48 h-5 K/min→RT

EXAMPLE 1

For the manufacture of a load of glass solder comprising approximately 200 g in accordance with sample ECa15, the raw materials in accordance with Table 13 were weighted into a plastic bottle having a screw top and a volume of 1 l.

TABLE 14

Raw materials and weighted samples for the manufacture of the glass ECa15

| Component | ECa15 mol % | Raw material and supplier | ECa15 Weighted sample/g |
|---|---|---|---|
| $SiO_2$ | 60 | $SiO_2$ Millisil W8, Quarzwerk Frechen | 88.8 |
| $Al_2O_3$ | 3 | $Al(OH)_3$ Merck; fine powder | 11.6 |
| BaO | 21 | $BaCO_3$ Solvay Type AGK | 102.3 |
| CaO | 10 | $CaCO_3$ Merck; p.a. | 24.7 |
| $B_2O_3$ | 6 | $H_3BO_3$ Merck EMPROVE | 18.3 |

The raw materials were homogenized in a plastic container on a jar crusher for 60 minutes, with this process being assisted by added grinding balls of $Al_2O_3$. Subsequently, the batch was heated inductively with a high-frequency coil at air in a platinum 90/rhodium 10 crucible having a capacity of 200 ml and a premelt comprising the total batch was manufactured. The crucible with the premelt was kept at 1500° C. at air in a muffle furnace (carbolite HTF1800) for 2 hr. The glass melt was subsequently fritted in water and dried in a drying cupboard at 150° C. at air for 12 h.

The dried glass frit was first precomminuted for the manufacture of a glass powder in a disk rocker mill (Retsch RS1) lined with hard metal to a grain fraction<500 μm (mesh size of a metal sieve). The actual grinding took place in a planetary ball mill (Fritsch Pulverisette 5) using agate containers and agate grinding balls. The grinding conditions were selected such that a particle size distribution with the following typical characteristics arises when using the precomminuted glass frit: $D_{10}$ approx. 2 μm, $D_{50}$ approx. 4 μm, $D_{90}$ approx. 10 μm (measurement in a Mastersizer 2000 using the Fraunhofer standard method and drier dispersion of the powder).

The glass powder thus obtained was processed to a paste suitable for screen printing using organic, polymer-based binders and at least one solvent under conditions which are typical in thick film technology. The procedure for the manufacture of a paste suitable for screen printing from a glass powder or also from a ceramic powder can in this respect be considered the prior art.

This paste was used, for example, for applying joining seams to CFY substrates (Plansee company) for interconnectors of SOFCs as a substrate having the dimensions 30 mm×60 mm×3 mm by means of screen printing. For this purpose, the glass paste was printed either in simple printing or in multiple printing (print-dry-print) directly as a peripheral frame onto the steel substrate. The printed substrates were dried at air in a drying cabinet in dependence on the solvents used for approx. 20 min to 40 min at 120° C. to 140° C. The thicknesses of the printed and dried joining seams from the printing paste were typically between 100 μm and 500 μm and the widths were between 3 mm and 4 mm. A second steel substrate of the same type and having the same dimensions was placed onto the printed substrate for the realization of the joint. In this respect, a central bore having a diameter of 4 mm, for the measurement of helium leakage rates after a joining has taken place, was present at one of the substrates. The model joints thus constructed were weighed down with a weight of approximately 20 g/cm² and were jointed at air in a muffling furnace (carbolite RWF1200) in accordance with the following furnace profile:
RT; 5 K/min→500 C/2 h; 2 K/min→950 C/4 h; −5 K/min→850 C/20 h; 5 K/min→RT.

Subsequently helium leak rates (Oerlikon PhoeniXL 300) of $<10^{-7}$ mbar l s$^{-1}$ were measured at the model joints at room temperature.

EXAMPLE 2

For the manufacture of a load comprising around 6000 g of the glass solder of the sample ELa7, the raw materials were weighed into plastic vessels having screw tops and a volume of 5 l in accordance with Table 15 in three individual loads of 1/3 each of the total batch.

TABLE 15

Raw materials and weighted samples for the manufacture of the glass ELa7

| Component | ELa7 mol % | Raw material and supplier | ELa7 Weighted sample/g |
|---|---|---|---|
| $SiO_2$ | 58.0 | $SiO_2$ Millisil W8, Quarzwerk Frechen | 1907 |
| $Al_2O_3$ | 2.0 | $Al(OH)_3$ Merck; fine powder | 171 |
| BaO | 20.0 | $BaCO_3$ Solvay Type AGK | 2160 |
| $La_2O_3$ | 11.0 | $La_2O_3$ Merck; p.a. | 1961 |
| $B_2O_3$ | 9.0 | $H_3BO_3$ Merck EMPROVE | 614 |

The batches were homogenized in the closable plastic vessels on a roller mill for 60 min, with this process being assisted by added milling balls of $Al_2O_3$ (diameter approx. 15 mm). The total batch was subsequently melted at air to a glass in a semicontinuous, electrically heated glass melting furnace (HTM Reetz, Berlin) which was equipped with a 1 l platinum 90/rhodium 10 crucible. The total load was again divided into three individual loads for this purpose. I.e. a respective 1/3 of the raw material batch was loaded into the melting crucible in a period of 30 min. After the end of loading, the glass melt was kept at 1500° C. for 2 h and then poured into cold, deionized water. The glass frit thus manufactured was dried at 150° C. at air in a drying cupboard for 12 h.

The dried glass frit was first precomminuted using a drum mill on a pulley seat for the manufacture of a glass powder. A grain fraction<500 μm (mesh width of a metal sieve) was realized by a repeated screening. The milling of the fraction precomminuted in this manner took place in an opposed jet mill (Alpine Fluidized Bed Opposed Jet Mill 100AFG) to a particle size distribution having the following characteristics: $D_{10}=1$ µm, $D_{50}=5$ µm, $D_{90}=10$ µm (measurement in a Mastersizer 2000 according to Fraunhofer standard method and dry dispersion of the powder). The powder thus manufactured was processed in accordance with the prior art using suitable polymer binders and solvents to form a pourable slurry. A film having the thickness of 250 µm was cast from the slurry. The procedure for the casting of a film from glass powder or also a ceramic powder can be considered as prior art in this respect. Closed joint frames having the dimensions of approx. 25 mm×50 mm and a width of approx. 3 mm were cut out of the film and were placed centrally between two CFY substrates (Plansee) having the dimensions 30 mm×60 mm×3 mm for the manufacture of model joints. In this respect, one of the substrates again had a central bore having a diameter of 3 mm. The model joints thus built up were weighed down by a weight of approx. 20 g/cm² joint seam (e.g. $Al_2O_3$ ceramic elements) and joined in a muffling furnace (Carbolite RWF1200) at air according to the following furnace profile: RT; 5 K/min→500° C./2 h; 2 K/min→950° C./4 h; 5 K/min→850° C./20 h; 5 K/min→RT.

Subsequently, helium leak rates (Oerlikon PhoeniXL 300) of $<10^{-7}$ mbar l s$^{-1}$ were measured at the model joints at room temperature.

The invention claimed is:

1. A composition for producing glass solders for high-temperature applications consisting of
   $SiO_2$ having a proportion in the range from 48 mol % to 62 mol %;
   $Al_2O_3$ having a proportion in the range from 0.5 mol % to 6 mol %;
   $B_2O_3$ having a proportion in the range from 4 mol % to 12 mol %;
   BaO having a proportion in the range from 12 mol % to 30 mol %; and
   at least one oxide selected from the group consisting of CaO and $R_2O_3$, CaO having a proportion in the range from 2.5 mol % to 15 mol % and an $R_2O_3$ having a proportion in the range from 0.5 mol % to 15 mol %;
   wherein the $R_2O_3$ is $La_2O_3$, $Y_2O_3$, $Sc_2O_3$, or a lanthanoid-series oxide,
   and in so doing an $SiO_2$:BaO ratio in the range of 1.9 to 4 is observed.

2. A composition in accordance with claim 1, wherein the portion of BaO lies in the range from 16 mol % to 30 mol % and the at least one oxide is $La_2O_3$.

3. A composition in accordance with claim 1, wherein the at least one oxide is CaO and the $SiO_2$:BaO ratio is in the range from 1.9 to 3.5.

4. A composition in accordance with claim 1, wherein the at least one oxide is $La_2O_3$ and the $SiO_2$:BaO ratio is in the range from 2.5 to 3.8.

5. A composition in accordance with claim 1, wherein the at least one oxide is CaO and $La_2O_3$ and the $SiO_2$:BaO ratio is in the range from 2.6 to 4.

6. A composition for producing glass solders for high-temperature consisting of
   $SiO_2$ having a proportion in the range from 48 mol % to 62 mol %;
   $Al_2O_3$ having a proportion in the range from 0.5 mol % to 6 mol %;
   $B_2O_3$ having a proportion in the range from 4 mol % to 12 mol %;
   BaO having a proportion in the range from 12 mol % to 30 mol %;
   at least one oxide selected from the group consisting of CaO and $R_2O_3$, CaO having a proportion in the range from 2.5 mol % to 15 mol % and an $R_2O_3$ having a proportion in the range from 0.5 mol % to 15 mol %, wherein the $R_2O_3$ is $La_2O_3$, $Y_2O_3$, $Sc_2O_3$, or a lanthanoid-series oxide; and
   at least one further oxide selected from the group consisting of $Ta_2O_5$, $Nb_2O_5$, $SnO_2$, $GeO_2$, $As_2O_3$, and $Sb_2O_3$, where the proportion of one or more of these oxides is kept below 10 mol %;
   and in so doing an $SiO_2$:BaO ratio in the range of 1.9 to 4 is observed.

* * * * *